United States Patent
Brown, Sr.

(10) Patent No.: US 10,287,103 B2
(45) Date of Patent: May 14, 2019

(54) QUICK DISCONNECT ROLLER ASSEMBLY

(71) Applicant: Terry Michael Brown, Sr., Vincennes, IN (US)

(72) Inventor: Terry Michael Brown, Sr., Vincennes, IN (US)

(*) Notice: Subject to any disclaimer, the term of this patent is extended or adjusted under 35 U.S.C. 154(b) by 0 days.

(21) Appl. No.: 15/492,565

(22) Filed: Apr. 20, 2017

(65) Prior Publication Data
US 2018/0072508 A1 Mar. 15, 2018

Related U.S. Application Data

(60) Provisional application No. 62/394,990, filed on Sep. 15, 2016.

(51) Int. Cl.
*B65G 39/02* (2006.01)

(52) U.S. Cl.
CPC .................. *B65G 39/02* (2013.01)

(58) Field of Classification Search
CPC ..................................... B65G 39/02

USPC ........................................... 198/842
See application file for complete search history.

(56) References Cited

U.S. PATENT DOCUMENTS

| 6,663,313 B2 * | 12/2003 | Lewis | F16D 1/096 403/369 |
| 9,415,943 B2 * | 8/2016 | Carrara | B65G 39/02 |

\* cited by examiner

*Primary Examiner* — Timothy R Waggoner
*Assistant Examiner* — Lester Rushin, III
(74) *Attorney, Agent, or Firm* — Oliff PLC; R. Brian Drozd

(57) ABSTRACT

A quick release roller for a conveyor system is configured to permit easy maintenance and replacement of the rollers in the system. The roller includes first and second roller segments that may be cooperatively joined together around a mounting shaft carried by the conveyor. The segmented roller permits the quick release to be removed and attached to the conveyor without disassembly of other conveyor components supporting the roller. The quick release roller facilitates maintenance and service of the conveyor system while limiting operational downtime for the conveyor while being serviced.

12 Claims, 2 Drawing Sheets

QUICK DISCONNECT ROLLER ASSEMBLY

CROSS-REFERENCE TO RELATED APPLICATION

This application claims the benefit of priority of U.S. provisional application No. 62/394,990, filed Sep. 15, 2016, the contents of which are herein incorporated by reference.

BACKGROUND OF THE INVENTION

The present invention relates to rollers and, more particularly, to quick connect and disassemble rollers for conveyor systems.

Conveyor systems currently include a plurality of rollers to support and carry an endless belt entrained about the rollers. Occasionally the rollers need maintenance or in the event of a failure, require replacement. Previous means of replacing rollers require the removal of a shaft and counterparts (i.e. bolts, bearings, lock collars, and the like) associated with mounting the roller to the conveyor system. Servicing or replacement of these rollers requires that the conveyor system be brought off line for extended periods of time, thereby affecting production or distribution capabilities and throughput.

As can be seen, there is a need for quick connect and disassemble rollers to facilitate the servicing and replacement of rollers while reducing the downtime of the conveyor system to effectuate the repairs.

SUMMARY OF THE INVENTION

In one aspect of the present invention, a quick release roller includes a first roller segment and a second roller segment configured to be joined along an opposing mating surface to form a cylindrical roller body. A cylindrical recess is defined in the opposed mating surface along an axis of rotation of the cylindrical roller body. At least one protrusion extends from the opposed mating surface, while at least one cooperating recess is formed in the opposed mating surface. The cooperating are configured to cooperatively engage with the at least one protrusion when the first roller segment and the second roller segment are joined as the cylindrical roller body. A plurality of aligned apertures extend through the opposed mating surface of each of the first roller segment and the second roller segment. A fastener may be received within the aligned apertures to join the first roller segment and the second roller segment.

In some embodiments, a countersink bore is formed in a first end of the aligned apertures and is configured to receive a head of the fastener. A bushing may also be received in the countersink bore. A plurality of threads may be defined in a second end of the aligned apertures. In some cases, a slot may be defined in a second end of the aligned apertures. A threaded insert, having a protruding tab, may be received in the second end of the aligned apertures and the protruding tab is oriented to engage within the slot.

In other embodiments, the first roller segment may include the at least one protrusion extending from the opposing mating surface; and the second roller segment may include at least one recess formed in the opposing mating surface. Similarly, the first roller segment may also include the at least one recess formed in the opposing mating surface and the second roller segment may include the at least one protrusion formed in the opposing mating surface.

An annular channel may be formed in an end face of each of the first roller segment and the second roller segment. The annular channel defines a hub oriented about the axis of rotation of the quick release roller.

Each of the first roller segment and the second roller segment are identical. In other instances, at least one annular flange radially extends about the axis of rotation from each of the first roller segment and the second roller segment. The annular flange may also extend from an end face of the first roller segment and the second roller segment. Each of the first roller segment and the second roller segment are semi-circular cylindrical bodies.

In other aspects, a roller assembly includes a first roller segment having a first outer arcuate surface, a first inner mating surface, and at least one protrusion extending from the first inner mating surface. A second roller segment includes a second outer arcuate surface, a second inner mating surface and at least one recess formed in the second inner mating surface. A semicircular cylindrical recess is defined in each of the first inner mating surface and the second inner mating surface along a common rotational axis. A plurality of aligned apertures extend through the first inner mating surface and the second inner mating surface. The first roller segment and the second roller segment are configured to be joined along the first inner mating surface and second inner mating surface with the at least one protrusion in cooperative engagement with the at least one recess.

A fastener can be received within the plurality of aligned apertures and is configured to join the first roller segment to the second roller segment. A countersink bore may extend into a first end of the plurality of aligned apertures, and is dimensioned to receive a head of the fastener. A slot may defined in a second end of the plurality of aligned apertures. A threaded insert having a protruding tab may be received within the second end of the plurality of aligned apertures and the protruding tab is configured to be received within the slot. At least one annular flange may be provided that radially extends about the common rotational axis from each of the first roller segment and the second roller segment.

These and other features, aspects and advantages of the present invention will become better understood with reference to the following drawings, description and claims.

DETAILED DESCRIPTION OF THE INVENTION

Figure 1:
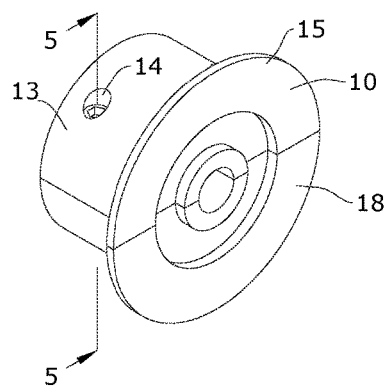
FIG. 1 is a perspective view of an embodiment of a quick disconnect roller.
Figure 2:
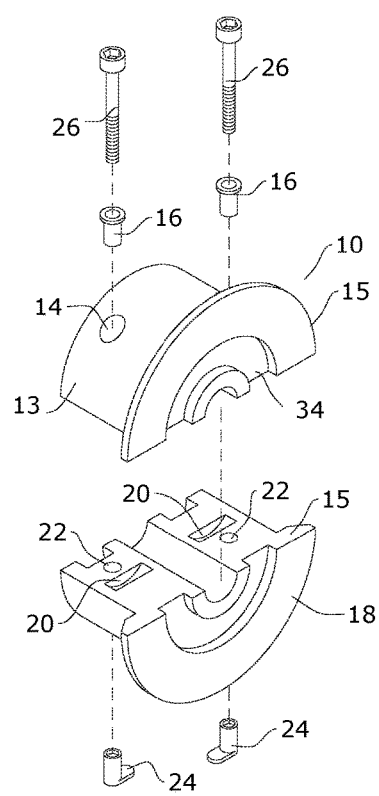
FIG. 2 is an upper exploded perspective view the quick disconnect roller.
Figure 3:
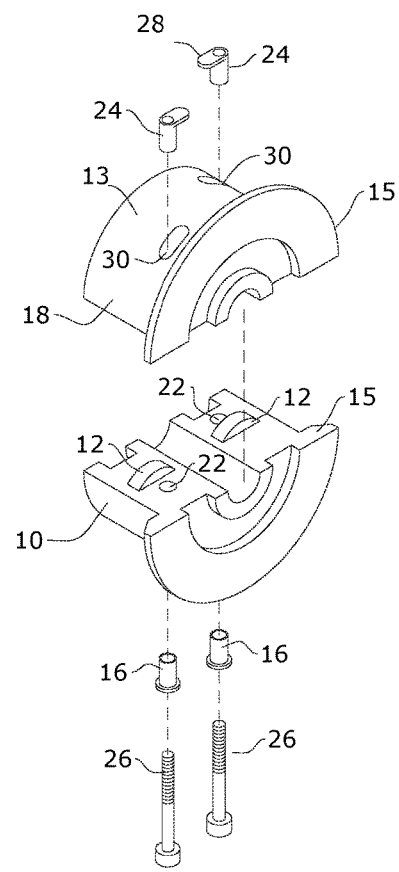
FIG. 3 is a lower exploded view of the quick disconnect roller.
Figure 4:
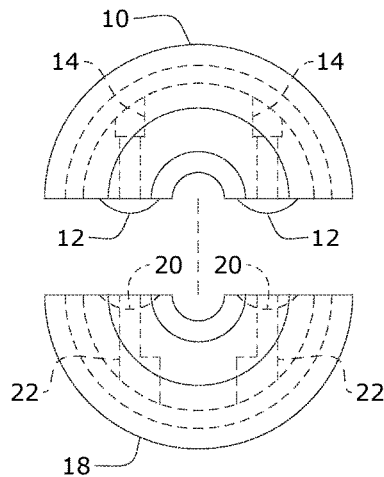
FIG. 4 is a front elevation view illustrating a first roller segment and a second roller segment.
Figure 5:
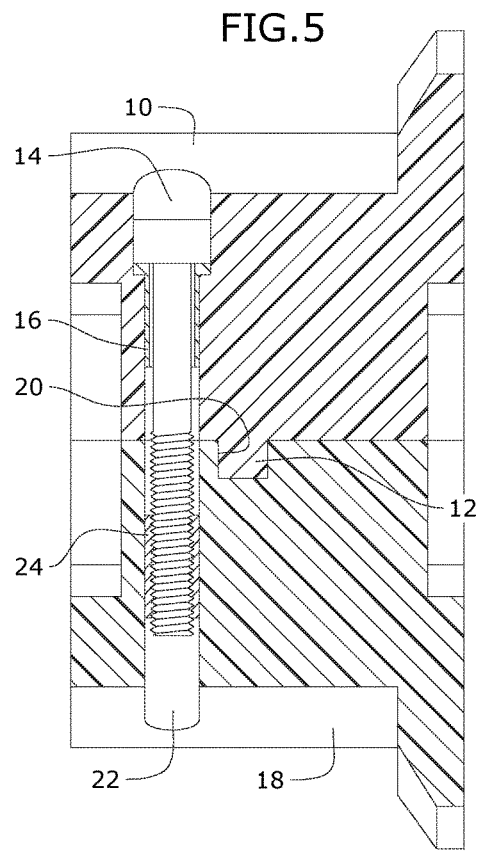
FIG. 5 is a side section view of the quick disconnect roller taken along line 5-5 in FIG. 1.
Figure 6:
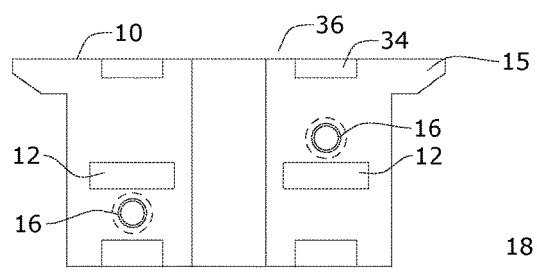
FIG. 6 is an interior mating face view of a first roller section.
Figure 7:
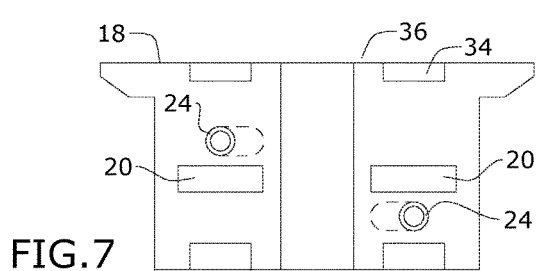
FIG. 7 is an interior mating face view of a second roller section.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a readily serviceable quick disconnect roller for a conveyor system. The roller is amenable for use as an end roller or a center roller. The quick disconnect roller allows users to replace rollers and counterparts easily and efficiently.

Referring now to the Figures, quick disconnect roller includes a first roller segment 10 and a second roller segment 18 joined along an opposed inner mating surface. The first roller segment 10 and the second roller segment 18 have a respective outer arcuate surface 13. Preferably the first roller segment 10 and the second roller segment 18 are formed as semi-circular cylindrical bodies. The first and second roller segment 10, 18 are joined along the opposed inner mating surface to form a cylindrical roller body configured for axial rotation about a rotational axis of the roller to provide a supported conveyor surface. The conveyor surface may include an endless belt entrained about a plurality of rollers. The first and second roller segment 10, 18 may include at least one annular flange 15 radially extending about the rotational axis of the roller.

The mating surface of the first roller segment 10 includes at least one protrusion 12 extending therefrom. The mating surface of the second roller segment 18 has at least one cooperating recess 20 defined therein, such that the at least one protrusion 12 and the at least one recess 20 are configured for cooperative engagement to provide for the alignment of the first roller segment 10 and the second roller segment 18 to form the cylindrical roller body. The at least one protrusion 12 and the at least one recess 20 are preferably formed in a keyed relation such that they may only cooperatively engage each other when the first roller segment 10 and the second roller segment 18 are positioned in a correct orientation.

As will be appreciated, the at least one protrusion 12 and the at least one recess 20 may also be formed in an opposite relation relative to the first roller segment 10 and the second roller segment 18. Similarly the first roller segment 10 and the second roller segment 18 may also be configured such that they each have at least one protrusion 12 and at least one cooperating recess 20.

Each of the first and second roller segment 10, 18 may include a plurality of aligned apertures 22 extending through the common face and configured to receive a fastener 26, such as a bolt, pin, or screw, for joining the first and second roller segment 10, 18. A first end of the aligned apertures 22 may include a countersink bore 14 to receive a head of the fastener 26. The countersink bore 14 may also be configured to receive a bushing 16.

A second end of the aligned apertures 22 may include a plurality of threads which may be formed within an interior surface of the aligned apertures 22 or may be provided by a threaded insert 24 received in the second end of the aligned apertures 22. The threaded insert 24 is configured with a plurality of internal threads for engagement with a plurality of external threads of the fastener 26. The threaded insert 24 may have a protruding tab 28 that is received within a corresponding slot 30 formed in the second end of the aligned apertures 22 to prevent rotation of the threaded insert 24 while threadingly receiving the fastener 26.

Each of the first roller segment 10 and the second roller segment 18 are provided a semicircular cylindrical recess defined along the axis of rotation such that they may be joined about a shaft carried on the conveyor system. An end face of the first roller segment 10 and the second roller segment 18 may have an annular channel 34 formed around the axis of rotation to define a hub 36.

Depending on the application, the first roller segment 10 and the second roller segment 18 may be formed from any suitable material such as metal, plastics, polymeric materials, rubber, and elastomeric materials.

The quick release roller allows a user to remove the roller from a conveyor system for servicing or replacement without the need for the removal of conveyor shaft and associated counterparts. Once the roller is serviced, the roller may be reinstalled by simply joining the first roller segment 10 and the second roller segment 18 around the supporting conveyor shaft. As will be appreciated the quick release roller may be formed in various lengths, diameters, and hub radii depending upon the requirements of the conveyor system.

In some instances, such as where the roller does not have an annular flange 15 or has an annular flange 15 on opposed ends of the roller, the first roller segment 10 and second roller segment 18 may be identically formed, which may be advantageous for limiting the number of parts that need to be manufactured, maintained in inventory, or carried by a maintenance technician servicing the conveyor system. Similarly the outer arcuate surface 13 may be formed in the shape of a cam having one or more lobes, gear, or other body rotationally carried on a shaft.

It should be understood, of course, that the foregoing relates to exemplary embodiments of the invention and that modifications may be made without departing from the spirit and scope of the invention as set forth in the following claims.

What is claimed is:

1. A quick release roller, comprising:
   a first roller segment and a second roller segment configured to be joined along an opposing mating surface to form a cylindrical roller body;
   a cylindrical recess defined in the opposed mating surface along an axis of rotation of the cylindrical roller body;
   at least one protrusion extending from the opposed mating surface;
   at least one cooperating recess formed in the opposed mating surface, configured to cooperatively engage with the at least one protrusion when the first roller segment and the second roller segment are joined as the cylindrical roller body;
   a plurality of aligned apertures extending through the opposed mating surface of each of the first roller segment and the second roller segment;
   a slot defined in a second end of the aligned apertures; and
   a threaded insert having a protruding tab, wherein the threaded insert is received in the second end of the aligned apertures and the protruding tab engages within the slot to lock the insert within the second roller segment, and wherein the threaded insert is threaded to receive a fastener through an aperture of the first roller segment, thereby securing the first and second roller segments together.

2. The quick release roller of claim 1, further comprising:
   a fastener received within the aligned apertures to join the first roller segment and the second roller segment.

3. The quick release roller of claim 2, further comprising:
   a countersink bore formed in a first end of the aligned apertures configured to receive a head of the fastener.

4. The quick release roller of claim 3, further comprising:
   a bushing received in the countersink bore.

5. The quick release roller of claim 2, further comprising a plurality of threads defined in a second end of the aligned apertures.

6. The quick release roller of claim 1, wherein
the first roller segment includes the at least one protrusion extending from the opposing mating surface; and
the second roller segment includes at least one recess formed in the opposing mating surface.

7. The quick release roller of claim 1, wherein:
the first roller segment includes the at least one recess formed in the opposing mating surface; and
the second roller segment includes the at least one protrusion formed in the opposing mating surface.

8. The quick release roller of claim 1 further comprising:
an annular channel formed in an end face of each of the first roller segment and the second roller segment, the annular channel defining a hub oriented about the axis of rotation of the quick release roller.

9. The quick release roller of claim 1, wherein each of the first roller segment and the second roller segment are identical.

10. The quick release roller of claim 1, further comprising at least one annular flange radially extending about the axis of rotation from each of the first roller segment and the second roller segment.

11. The quick release roller of claim 10, wherein the annular flange extends from an end face of the first roller segment and the second roller segment.

12. The quick release roller of claim 1, wherein each of the first roller segment and the second roller segment are semi-circular cylindrical bodies.

\* \* \* \* \*